US012032097B2

(12) United States Patent
Onal et al.

(10) Patent No.: US 12,032,097 B2
(45) Date of Patent: Jul. 9, 2024

(54) HYBRID TIME-OF-FLIGHT AND IMAGER MODULE

(71) Applicant: Waymo LLC, Mountain View, CA (US)

(72) Inventors: Caner Onal, Palo Alto, CA (US); David Schleuning, Piedmont, CA (US); Brendan Hermalyn, San Francisco, CA (US); Simon Verghese, Mountain View, CA (US); Alex McCauley, Sunnyvale, CA (US); Brandyn White, Mountain View, CA (US); Ury Zhilinsky, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/171,883

(22) Filed: Feb. 21, 2023

(65) Prior Publication Data

US 2023/0194681 A1 Jun. 22, 2023

Related U.S. Application Data

(63) Continuation of application No. 16/229,193, filed on Dec. 21, 2018, now Pat. No. 11,609,313.

(Continued)

(51) Int. Cl.
*G01S 7/48* (2006.01)
*G01S 7/481* (2006.01)
(Continued)

(52) U.S. Cl.
CPC .......... *G01S 7/4865* (2013.01); *G01S 7/4804* (2013.01); *G01S 7/4816* (2013.01); *G01S 17/931* (2020.01)

(58) Field of Classification Search
CPC .... G01S 7/4865; G01S 7/4804; G01S 7/4816; G01S 17/931
(Continued)

(56) References Cited

U.S. PATENT DOCUMENTS

| 8,446,492 B2 | 5/2013 | Nakano et al. |
| 9,760,837 B1 | 9/2017 | Nowozin et al. |

(Continued)

FOREIGN PATENT DOCUMENTS

| CN | 106772431 | 5/2017 |
| CN | 107533139 A | 1/2018 |

(Continued)

OTHER PUBLICATIONS

Australian Government, IP Australia, Examination Report No. 1 dated Dec. 1, 2021, issued in connection with Australian Patent App. No. 2019315355, 8 pages.

(Continued)

*Primary Examiner* — Daniel L Murphy
(74) *Attorney, Agent, or Firm* — McDonnell Boehnen Hulbert & Berghoff LLP

(57) ABSTRACT

The present disclosure relates to systems and methods that provide both an image of a scene and depth information for the scene. An example system includes at least one time-of-flight (ToF) sensor and an imaging sensor. The ToF sensor and the imaging sensor are configured to receive light from a scene. The system also includes at least one light source and a controller that carries out operations. The operations include causing the at least one light source to illuminate at least a portion of the scene with illumination light according to an illumination schedule. The operations also include causing the at least one ToF sensor to provide information indicative of a depth map of the scene based on the illumination light. The operations additionally include causing the (Continued)

imaging sensor to provide information indicative of an image of the scene based on the illumination light.

20 Claims, 10 Drawing Sheets

Related U.S. Application Data

(60) Provisional application No. 62/712,586, filed on Jul. 31, 2018.

(51) Int. Cl.
  *G01S 7/4865* (2020.01)
  *G01S 17/931* (2020.01)

(58) Field of Classification Search
  USPC .......................................................... 356/5.01
  See application file for complete search history.

(56) References Cited

U.S. PATENT DOCUMENTS

| | | | |
|---|---|---|---|
| 9,891,309 | B2 | 2/2018 | Hudman et al. |
| 11,609,313 | B2 * | 3/2023 | Onal .................. G01S 17/86 |
| 2012/0044093 | A1 | 2/2012 | Pala |
| 2013/0321790 | A1 * | 12/2013 | Kirby .................. G01P 3/36 |
| | | | 356/3.14 |
| 2015/0062558 | A1 | 3/2015 | Koppal et al. |
| 2016/0295133 | A1 | 10/2016 | Rudmann et al. |
| 2016/0295193 | A1 | 10/2016 | Van Nieuwenhove et al. |
| 2016/0349043 | A1 | 12/2016 | Lee et al. |
| 2017/0052257 | A1 | 2/2017 | Ito et al. |
| 2017/0060254 | A1 | 3/2017 | Molchanov et al. |
| 2017/0061219 | A1 | 3/2017 | Shin et al. |
| 2017/0200273 | A1 | 7/2017 | Kamilov et al. |
| 2017/0242123 | A1 | 8/2017 | Yamazaki et al. |
| 2017/0363465 | A1 | 12/2017 | Send et al. |
| 2017/0365068 | A1 | 12/2017 | Tan et al. |
| 2018/0081043 | A1 | 3/2018 | Demirtas et al. |
| 2018/0164439 | A1 | 6/2018 | Droz et al. |
| 2018/0224545 | A1 | 8/2018 | Price et al. |
| 2019/0072656 | A1 | 3/2019 | Giesen et al. |
| 2019/0317217 | A1 | 10/2019 | Day et al. |

FOREIGN PATENT DOCUMENTS

| | | |
|---|---|---|
| CN | 207281284 U | 4/2018 |
| CN | 108965666 | 12/2018 |
| FR | 3053123 | 12/2017 |
| JP | 2012208504 | 10/2012 |
| JP | 2018066701 | 4/2018 |
| KR | 10-2017-0041681 | 4/2017 |
| WO | 2011/038954 | 4/2011 |
| WO | 2016/172960 | 11/2016 |
| WO | 2018/127789 | 7/2018 |

OTHER PUBLICATIONS

European Patent Office, Extended European Search Report dated Mar. 7, 2022, issued in connection with European Patent Application No. 19845087.6, 9 pages.

Huang and Barth, "Tightly-Coupled LIDAR and Computer Vision Integration for Vehicle Detection", 2009 (Year: 2009).

International Searching Authority, International Search Report and Written Opinion dated Nov. 7, 2019, issued in connection with International Patent Application No. PCT/US2019/042572, filed on Jul. 19, 2019, 10 pages.

Japanese Patent Office, Office Action dated Apr. 8, 2022, issued in connection with Japanese Patent Application No. 2021-503144, 11 pages (with English Translation).

Kammel and Pitzer, "Lidar-based lane marker detection and mapping", 2008 (Year: 2008).

Martin-Martin et al., "Deterioration of Depth Measurements Due to Interference of Multiple RGB-D Sensors," IEEE International Conference on Intelligent Robots and Systems, Conference: IEEE/RSJ International Conference on Intelligent Robots and Systems, published Sep. 2014, DOI-10.1109/IROS.2014.6943155, 8 pages.

\* cited by examiner

Top View

Top View

HYBRID TIME-OF-FLIGHT AND IMAGER MODULE

CROSS-REFERENCE TO RELATED APPLICATION

The present application claims the benefit of U.S. patent application Ser. No. 16/229,193 filed Dec. 21, 2018 and U.S. Patent Application No. 62/712,586, filed Jul. 31, 2018, the contents of both of which are incorporated herein by reference in their entirety.

BACKGROUND

Imaging sensors typically provide high quality, high-resolution, two-dimensional images of a scene, but do not typically provide depth information. Time-of-Flight (ToF) sensors typically provide low-resolution depth information about a scene, but can be subject to stray light "blooming" and/or provide inaccurate depth information when imaging highly reflective or highly absorbing materials.

SUMMARY

The present disclosure beneficially combines aspects of imaging sensors and ToF sensors to provide more accurate, higher-resolution depth information.

In a first aspect, a system is provided. The system includes at least one time-of-flight (ToF) sensor and an imaging sensor. The at least one ToF sensor and the imaging sensor are configured to receive light from a scene. The system also includes at least one light source. The system further includes a controller that carries out operations. The operations include causing the at least one light source to illuminate at least a portion of the scene with illumination light according to an illumination schedule. The operations include causing the at least one ToF sensor to provide information indicative of a depth map of the scene based on the illumination light. The operations also include causing the imaging sensor to provide information indicative of an image of the scene based on the illumination light.

In a second aspect, a method is provided. The method includes causing at least one light source to illuminate a scene with illumination light according to an illumination schedule. The method also includes causing a time-of-flight (ToF) sensor to provide information indicative of a depth map of the scene based on the illumination light. The method yet further includes causing an imaging sensor to provide information indicative of an image of the scene based on the illumination light.

In a third aspect, a method is provided. The method includes determining that a first vehicle and a second vehicle are within a threshold distance from one another. The first vehicle and the second vehicle each include respective hybrid imaging systems. The hybrid imaging systems each include at least one time-of-flight (ToF) sensor and an imaging sensor. The at least one ToF sensor and the imaging sensor are configured to receive light from a scene. The hybrid imaging systems include at least one light source. The method further includes adjusting at least one operating parameter of the at least one ToF sensor, the imaging sensor, or the at least one light source.

In a fourth aspect, a method is provided. The method includes providing prior information. The prior information includes three-dimensional information of a scene. The method also includes causing at least one light source to illuminate a scene with illumination light according to an illumination schedule. The method additionally includes causing a time-of-flight (ToF) sensor to provide information indicative of a depth map of the scene based on the illumination light. The method also includes causing an imaging sensor to provide information indicative of an image of the scene based on the illumination light.

Other aspects, embodiments, and implementations will become apparent to those of ordinary skill in the art by reading the following detailed description, with reference where appropriate to the accompanying drawings.

DETAILED DESCRIPTION

Figure 1:
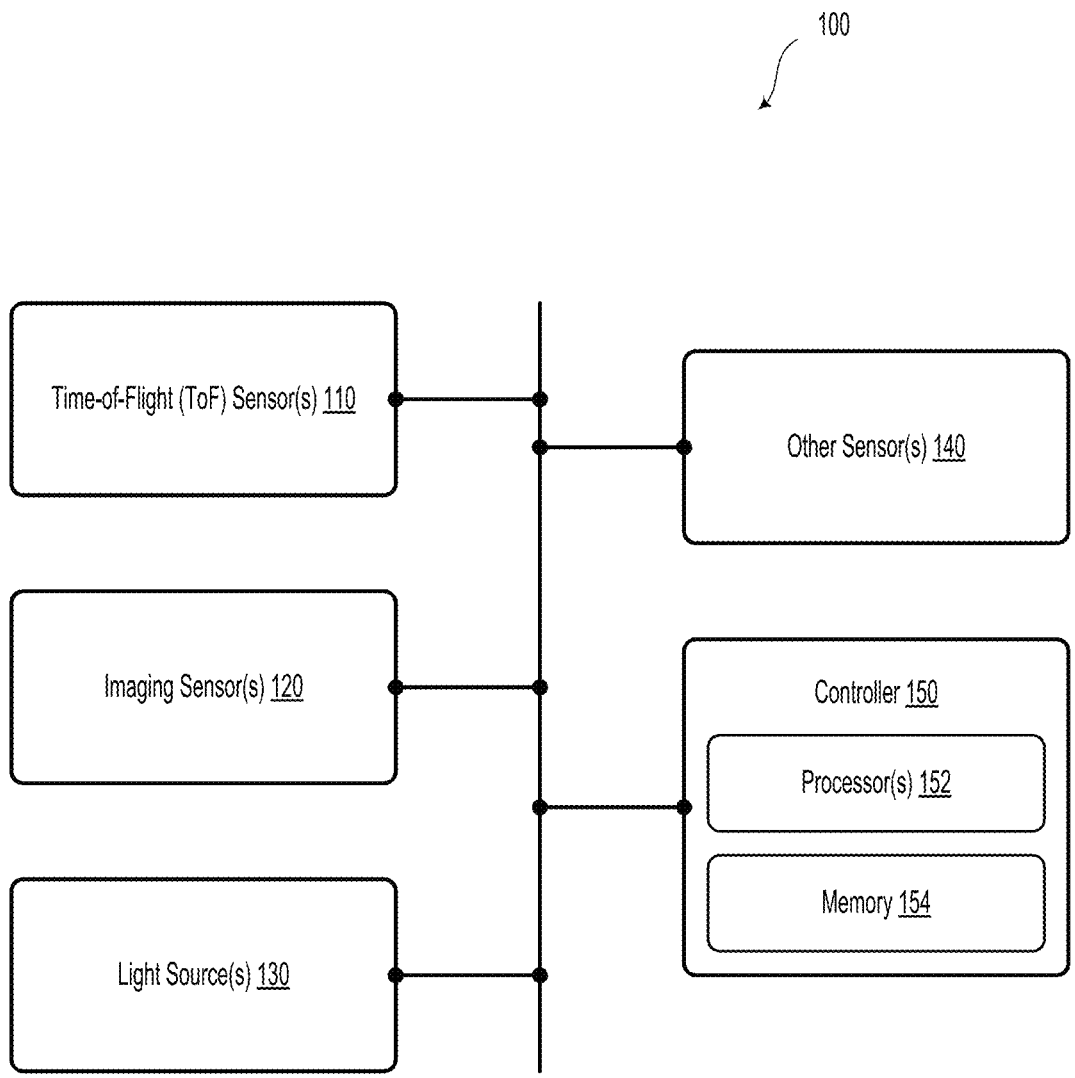
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A hybrid imaging system could include: 1) at least one ToF sensor; 2) an imaging sensor; 3) at least one light source for illuminating the scene using continuous, pulsed, or aperiodic illumination; and 4) a controller, which may include a computer, a processor, and/or a Deep Neural Net. The ToF sensor and the imaging sensor may be spatially registered to one another and may utilize overlapping portions of the same optical path.

Each sensor unit of a plurality of sensor units of such a hybrid imaging system could be mounted on each side (or corner) of a vehicle. Respective sensor units could also be mounted in one or more spinning platforms at various locations on the vehicle. In an example embodiment, each sensor unit may include a 180 degree field of view of a scene around the vehicle. In some embodiments, sensor units could be positioned on the vehicle so as to have partially overlapping fields of view of the environment around the vehicle.

In an example embodiment, to avoid blooming or other depth information artifacts, a plurality of ToF sensors could be associated with one or more image sensors in a given sensor unit. The respective ToF sensors could be spread out (e.g., spaced apart by 10 cm or more) so as to reduce the effects of blooming from specular reflections and other bright light sources. In some embodiments, the ToF sensors could be operated between 10-100 MHz, however other operating frequencies are contemplated and possible. In some embodiments, the operating frequency of the respective ToF sensor may be adjusted based on a desired maximum depth sensing range. For instance, a ToF sensor could be operated at 20 MHz for a desired depth sensing range (e.g., unambiguous range) of approximately 7.5 meters. In some embodiments, the ToF sensor could have a maximum desired depth sensing range of 100 meters or more.

In some embodiments, the ToF sensor could include CMOS or CCD photo-sensitive elements (e.g., silicon PIN diodes). However, other types of ToF sensors and ToF sensor elements are contemplated. In some cases, the ToF sensor could be operated using various phase shift modes (e.g., a 2× or 4× phase shift).

In some embodiments, the imaging sensor could include an RGB imaging sensor, such as a megapixel-type camera sensor. The imaging sensor could include a plurality of CMOS or CCD photo-sensitive elements.

In some examples, one or more light sources could be used to illuminate the scene (or respective portions of the scene). In such scenarios, the light sources could be modulated to provide a predetermined light pulse (or series of light pulses) that could be used in conjunction with the ToF sensor to provide depth information. Additionally or alternatively, the series of light pulses (e.g., a pulse repetition rate, a pulse duration, and/or a duty cycle) could be selected so as to provide a desired exposure for the imaging sensor.

The one or more light sources could include a light strip that is disposed along a portion of the vehicle. Additionally or alternatively, the one or more light sources could include a grid of light panels, each segment of which could individually provide different light pulses. Yet further, the one or more light sources could provide one or more light beams that can be moved in a point-wise and/or scanning fashion.

The one or more light sources could be operated in continuous wave (CW) and/or in pulsed (e.g., sine wave, sawtooth, or square wave) operation mode. Without limitation, the one or more light sources could include at least one of: a laser diode, a light-emitting diode, a plasma light source, a strobe, a solid-state laser, a fiber laser, or another type of light source. The one or more light sources could be configured to emit light in the infrared wavelength range (e.g., 850, 905, and/or 940 nanometers). In some embodiments, multiple illumination light wavelengths could be used to disambiguate between multiple light sources, etc. Additionally or alternatively, the illumination wavelength may be adjusted based on an amount of ambient light in the environment and/or a time of day.

The controller could be operable to combine outputs of the respective sensors (e.g., using sensor fusion) and/or make inferences about the three-dimensional scene around the vehicle. For example, the controller could make inferences to provide a grayscale or color-intensity map of the vehicle's surroundings. The inferences may additionally or alternatively provide information about objects in the vehicle's environment. In an example embodiment, the object information could be provided at a refresh rate of 60 or 120 Hz. However, other refresh rates are possible and contemplated.

In an example embodiment, the system could include one or more deep neural networks. The deep neural networks(s) could be utilized to provide the inferences based on training data and/or an operating context of the vehicle. In some cases, the low-resolution depth information and the image information may be provided to the deep neural network. Subsequently, the deep neural network could make inferences based on the received information and/or provide output depth maps (e.g., point clouds) at a high-resolution.

In some embodiments, two or more of: the ToF sensor, the image sensor, the light source, and the controller could be coupled to the same substrate. That is, the system could include a monolithic chip or substrate so as to provide a smaller sensor package and/or provide other performance improvements.

II. Example Systems

FIG. 1 illustrates a system 100, according to an example embodiment. The system 100 includes at least one Time-of-Flight (ToF) sensor 110, or ToF camera. In an example embodiment, the at least one ToF sensor 110 could include a plurality of complementary metal-oxide semiconductor (CMOS) or charge-coupled device (CCD) photosensitive elements (e.g., silicon PIN diodes). Other types of photosensitive elements could be utilized by the ToF sensor 110.

In some embodiments, the at least one ToF sensor 110 could be configured to actively estimate distances to environmental features in its respective field of view based on the speed of light. Namely, the ToF sensor 110 could measure the time-of-flight of a light signal (e.g., a light pulse) upon traveling between a light source (e.g., light source 130) and an object in the scene. Based on estimating the time-of-flight of light pulses from a plurality of locations within a scene, a range image or depth map can be built up based on the ToF sensor's field of view. While the distance resolution can be 1 centimeter or less, the lateral resolution can be low as compared to standard 2D imaging cameras.

In some embodiments, the ToF sensor 110 can obtain images at 120 Hz or faster. Without limitation, the ToF sensor 110 could include a range-gated imager or a direct time-of-flight imager.

The system 100 also includes at least one imaging sensor 120. In an example embodiment, the imaging sensor 120 could include a plurality of photosensitive elements. In such a scenario, the plurality of photosensitive elements could include at least one million photosensitive elements. The at least one ToF sensor 110 and the at least one imaging sensor 120 are configured to receive light from a scene.

The system 100 also includes at least one light source 130. In an example embodiment, the at least one light source 130 could include at least one of: a laser diode, a light-emitting diode, a plasma light source, a strobe light, a solid-state laser, or a fiber laser. Other types of light sources are possible and contemplated in the present disclosure. The at least one light source 130 could include a light strip (e.g., disposed along a portion of a vehicle). Additionally or alternatively, the at least one light source 130 could include, for example, a grid of light panels, each segment of which could individually provide different light pulses. Yet further, the at least one light source 130 could provide one or more light beams that can be moved in a point-wise and/or scanning fashion. The at least one light source 130 could be operated in a continuous wave (CW) mode and/or in a pulsed (e.g., sine wave, sawtooth, or square wave) operation mode.

In an example embodiment, the at least one light source 130 could be configured to emit infrared light (e.g., 900-1600 nanometers). However, other wavelengths of light are possible and contemplated.

The at least one light source 130 and the ToF imager 110 could be temporally synchronized. That is, a trigger signal to cause the light source 130 to emit light could also be provided to the ToF imager 110 as a temporal reference signal. As such, the ToF imager 110 may have information about a time of the actual onset of the light emitted from the light source 130. Additionally or alternatively, the ToF imager 110 could be calibrated based on a reference target at a known distance from the ToF imager 110.

In scenarios with multiple light sources and/or multiple ToF imagers, the multiple light sources could utilize time multiplexing or other types of signal multiplexing (e.g., frequency or code multiplexing) so as to disambiguate time-of-flight information (light pulses) obtained by a given ToF imager from the various light sources.

In some embodiments, the at least one light source 130 could be configured to emit light into an environment along a plurality of emission vectors toward various target locations so as to provide a desired resolution. In such scenarios, the at least one light source 130 could be operable to emit light along the plurality of emission vectors such that the emitted light interacts with an external environment of the system 100.

In an example embodiment, the respective emission vectors could include an azimuthal angle and/or an elevation angle (and/or corresponding angular ranges) with respect to a heading or location of a vehicle (e.g., vehicle 300 as illustrated and described with reference to FIG. 3A). In some embodiments, light emitted by the at least one light source 130 could be directed along the respective emission vectors by adjusting a movable mount and/or a movable mirror.

For example, the at least one light source 130 could emit light toward a movable mirror. By adjusting an orientation of the movable mirror, the emission vector of the light could be controllably modified. It will be understood that many different physical and optical techniques may be used to direct light toward a given target location. All such physical and optical techniques for adjusting an emission vector of light are contemplated herein.

Optionally, the system 100 may include other sensors 140. The other sensors 140 may include a LIDAR sensor, a radar sensor, or other types of sensors. For instance, system 100 could include a Global Positioning System (GPS), an Inertial Measurement Unit (IMU), a temperature sensor, a speed sensor, a camera, or a microphone. In such scenarios, any of the operational scenarios and/or methods described herein could include receiving information from the other sensors 140 and carrying out other operations or method steps based, at least in part, on the information received from the other sensors 140.

In an example embodiment, at least two of: the at least one ToF sensor 110, the imaging sensor 120, and the at least one light source 130 could be coupled to a common substrate. For example, the at least one ToF sensor 110, the imaging sensor 120, and the at least one light source 130 could be coupled to a vehicle. Namely, some or all elements of system 100 could provide at least a portion of the object detection and/or navigation capability of the vehicle. In example embodiments, the vehicle could be a semi-autonomous or fully-autonomous vehicle (e.g., a self-driving car). For instance, system 100 could be incorporated into vehicle 300 as illustrated and described in reference to FIGS. 3A, 4A, and 4B.

In some embodiments, system 100 could be part of a vehicle control system utilized to detect and potentially identify nearby vehicles, road boundaries, weather conditions, traffic signs and signals, and pedestrians, among other features within the environment surrounding the vehicle 300. For example, a vehicle control system may use depth map information to help determine control strategy for autonomous or semi-autonomous navigation. In some embodiments, depth map information may assist the vehicle control system to avoid obstacles while also assisting with determining proper paths for navigation.

While some examples described herein include system 100 as being incorporated into a vehicle, it will be understood that other applications are possible. For example, system 100 could include, or be incorporated into, a robotic system, an aerial vehicle, a smart home device, a smart infrastructure system, etc.

System 100 includes a controller 150. In some embodiments, the controller 150 could include an on-board vehicle computer, an external computer, or a mobile computing platform, such as a smartphone, tablet device, personal computer, wearable device, etc. Additionally or alternatively, the controller 150 can include, or could be connected to, a remotely-located computer system, such as a cloud server network. In an example embodiment, the controller 150 may be configured to carry out some or all of the operations, method blocks, or steps described herein. Without limitation, the controller 150 could additionally or alternatively include at least one deep neural network, another type of machine learning system, and/or an artificial intelligence system.

The controller 150 may include one or more processors 152 and at least one memory 154. The processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations and method steps/blocks described herein. The instructions may be stored in a permanent or transitory manner in the memory 154.

Figure 2:
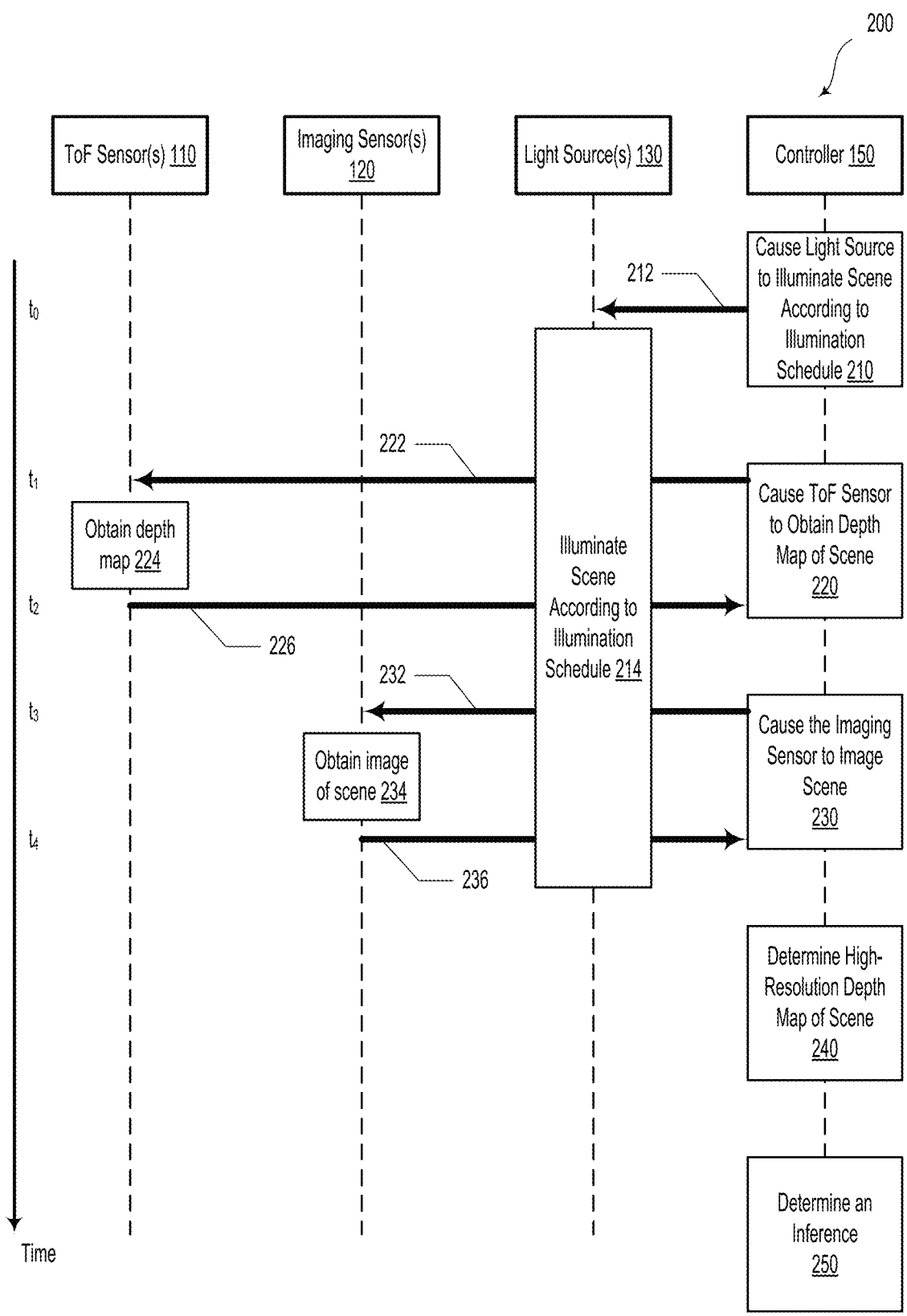
FIG. 2 illustrates an operating scenario of a system, according to example embodiments.

FIG. 2 illustrates an operating scenario 200 of the system 100, according to example embodiments. While the operating scenario 200 illustrates certain operations or blocks being in a certain order and being carried out by certain elements of system 100, it will be understood that other functions, orders of operations, and/or timing arrangements are contemplated herein.

Block 210 may include the controller 150 causing the at least one light source 130 to illuminate at least a portion of the scene with illumination light according to an illumination schedule. The illumination schedule could include, for example, at least one of: a predetermined light pulse repetition rate, a predetermined light pulse duration, a predetermined light pulse intensity, or a predetermined light pulse duty cycle. Other ways to convey desired aspects of the illumination light are contemplated herein.

In an example embodiment, instruction 212 could include, for example, a signal from the controller 150 to the light source 130 at time to. The instruction 212 could be indicative of the illumination schedule, an illumination level, or an illumination direction or sector, among other examples.

In response to receiving the instruction 212, the light source 130 could carry out block 214 to illuminate the scene according to the illumination schedule. As an example, the light source 130 could illuminate one or more light-emitter elements, which could be light-emitting diodes (LEDs), lasers, strobe light, or another type of light source. Such light-emitter elements could be illuminated according to the illumination schedule (e.g., illuminated for a desired time, illuminated at a desired frequency and duty cycle, etc.).

Block 220 includes causing the at least one ToF sensor 110 to provide information indicative of a depth map of the scene based on the illumination light. For example, at time block 220 could include providing an instruction 222 from the controller 150 to the ToF sensor 110. The instruction 222 could include a signal to trigger a depth mapping function of the ToF sensor 110. Additionally or alternatively, the instruction 222 could include information indicative of a desired field of view for scanning, a desired range for scanning, a desired resolution, and/or other desired aspects of the depth map and/or ToF sensor scan.

Block 224 could include the ToF sensor 110 obtaining a depth map based, at least in part, on the illumination of the scene from the light source 130. That is, in response to receiving the instruction 222, the ToF sensor 110 may carry out a depth-mapping scan of a field of view of a scene. In an example embodiment, the ToF sensor 110 could be operated between 10-100 MHz, however other operating frequencies are possible. In some embodiments, the operating frequency of the ToF sensor 110 may be adjusted based on a desired maximum depth sensing range. For instance, the ToF sensor 110 could be operated at 20 MHz for a desired depth sensing range of approximately 7.5 meters. In some embodiments, the ToF sensor 110 could have a maximum desired depth sensing range of 100 meters or more. In some embodiments that involve multiple ToF sensors, the ToF sensors could be configured to and/or instructed to carry out depth-mapping scans of different fields of view of the scene and/or over different distance ranges.

At time $t_2$, upon obtaining the depth map according to block 224, the ToF sensor 110 could provide information 226 to the controller 150. The information 226 may be indicative of the depth map of the scene. For example, the information 226 could include a distance-based point map of the scene. Additionally or alternatively, the information 226 could include a surface map of objects determined within the scene. Other types of information 226 are possible and contemplated.

Block 230 includes causing the imaging sensor 120 to provide information indicative of an image of the scene based on the illumination light provided by the light source 130. As an example, at time $t_3$, the controller 150 could provide an instruction 232 to the imaging sensor 120. The instruction 232 could include a signal for triggering an image capture function of the imaging sensor 120. Furthermore, the instruction 232 could include information regarding a desired exposure, ambient lighting level, ambient lighting color temperature, time of day, etc. While $t_1$ and $t_3$ are illustrated in FIG. 2 as being different, in some embodiments, times $t_1$ and $t_3$ could be similar or identical. That is, in some embodiments, at least some portions of the depth mapping and image capture processes could be triggered and conducted in parallel.

Block 234 includes, in response to receiving the instruction 232, the imaging sensor 120 obtaining an image of the scene. In other words, instruction 232 could trigger a physical shutter mechanism or a digital shutter so as to initiate an image capture process.

Upon capturing the image, at time $t_4$, the image sensor 120 could provide information 236 to the controller 150. The information 236 could include, for example, the captured image as well as other information, such as metadata regarding the captured image (e.g., exposure time, aperture setting, imager sensitivity (ISO), field of view extents, etc.). In some embodiments, the information 236 could include RAW image data, however other uncompressed and compressed image data formats (BMP, JPEG, GIF, PNG, TIFF, etc.) are possible and contemplated.

Block 240 could include determining a high-resolution depth map of the scene based on the depth map of the scene (e.g., information 226) and the image of the scene (e.g., information 236). In an example embodiment, the depth map information 226 and the image information 236 could be compared and/or correlated using various image processing algorithms. Such algorithms may include, without limitation, texture synthesis, image resampling algorithms, interpolation algorithms, image sharpening algorithms, edge-detection algorithms, and image blurring algorithms, etc. As such, the high-resolution depth map could include depth information about the scene with a higher spatial resolution than that of the depth map obtained by the ToF sensor 110. In some embodiments, the spatial resolution could relate to a target resolution at a given distance away from the system 100. Other spatial resolutions, both along a two-dimensional surface and within three-dimensional space, are possible and contemplated herein. As an example, the depth map obtained by the ToF sensor 110 could provide a spatial resolution between adjacent sampling points of 10 centimeters at a range of 20 meters. The high-resolution depth map could provide a spatial resolution of less than 5 centimeters at a range of 20 meters.

Block 250 may include determining at least one inference about the scene based on the depth map of the scene and the image of the scene. For example, the controller 150 could determine at least one inference about the scene based on the high-resolution depth map determined in block 240. In such a scenario, the at least one inference may include information about one or more objects in an environment of a vehicle or an operating context of the vehicle. In scenarios where the controller 150 includes a deep neural network, block 250 could be performed, at least in part, by the deep neural network.

While the operating scenario 200 describes various operations or blocks 210, 220, 230, 240, and 250 as being carried out by the controller 150, it will be understood that at least some of the operations of operating scenario 200 could be executed by one or more other computing devices.

While operating scenario 200 describes various operations, it will be understood that more or fewer operations are contemplated. For example, the operations could further include selecting an illumination schedule from among a plurality of possible illumination schedules so as to provide a desired exposure for the imaging sensor 120.

Figure 3A:
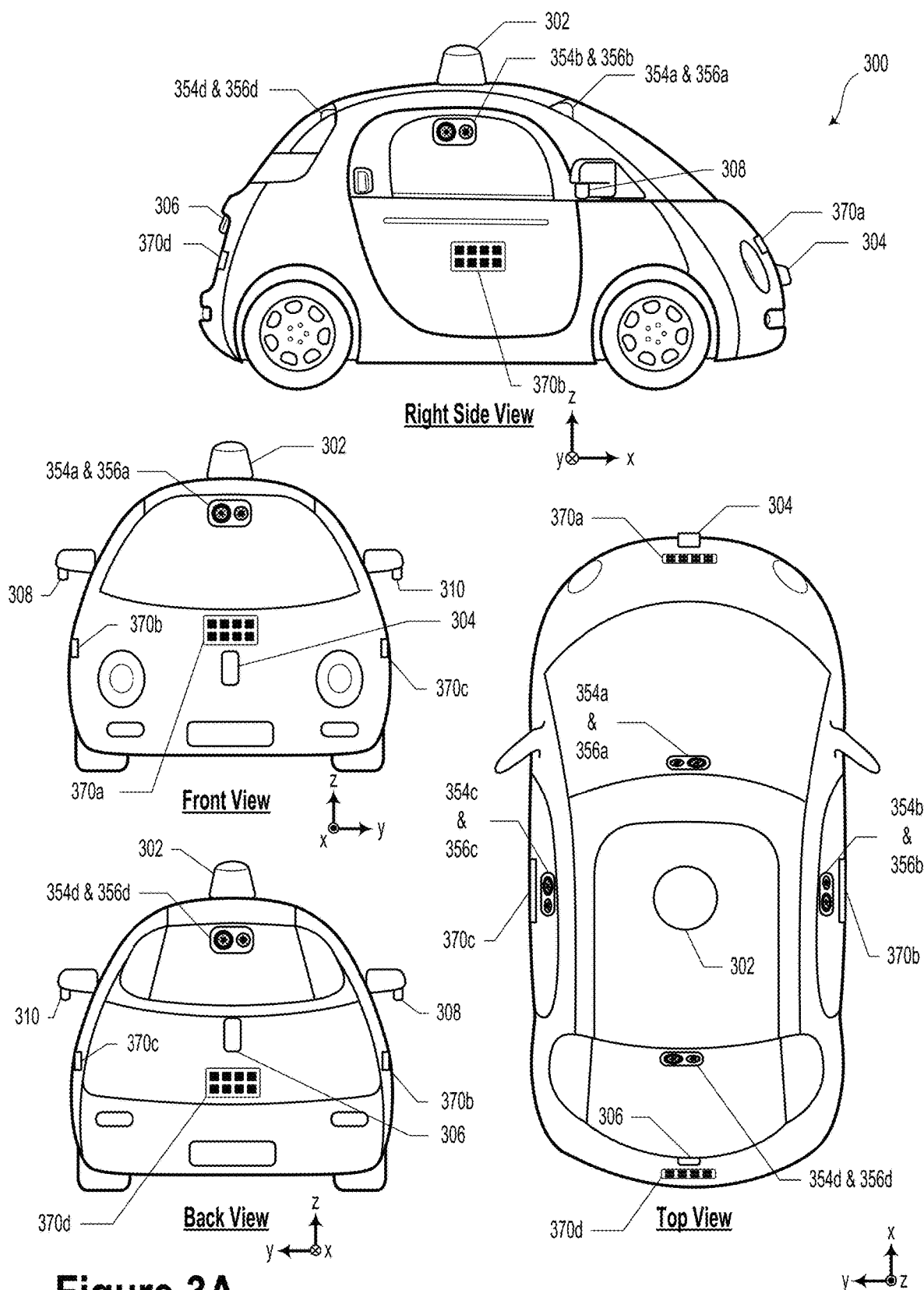
FIG. 3A illustrates a vehicle, according to an example embodiment.
Figure 3B:
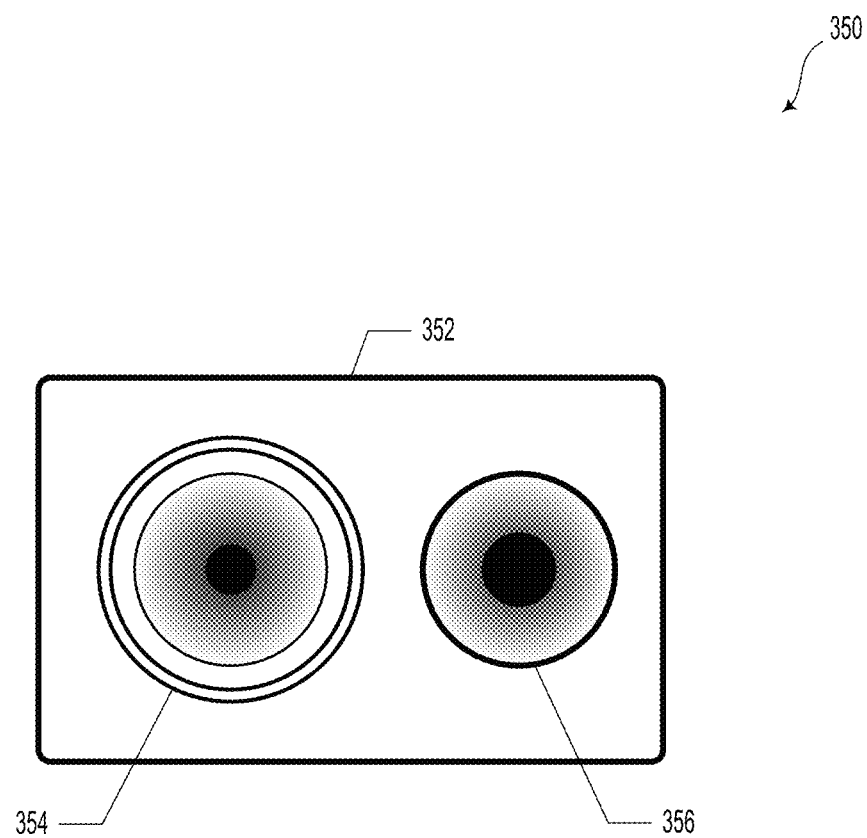
FIG. 3B illustrates a sensor unit, according to an example embodiment.
Figure 3C:
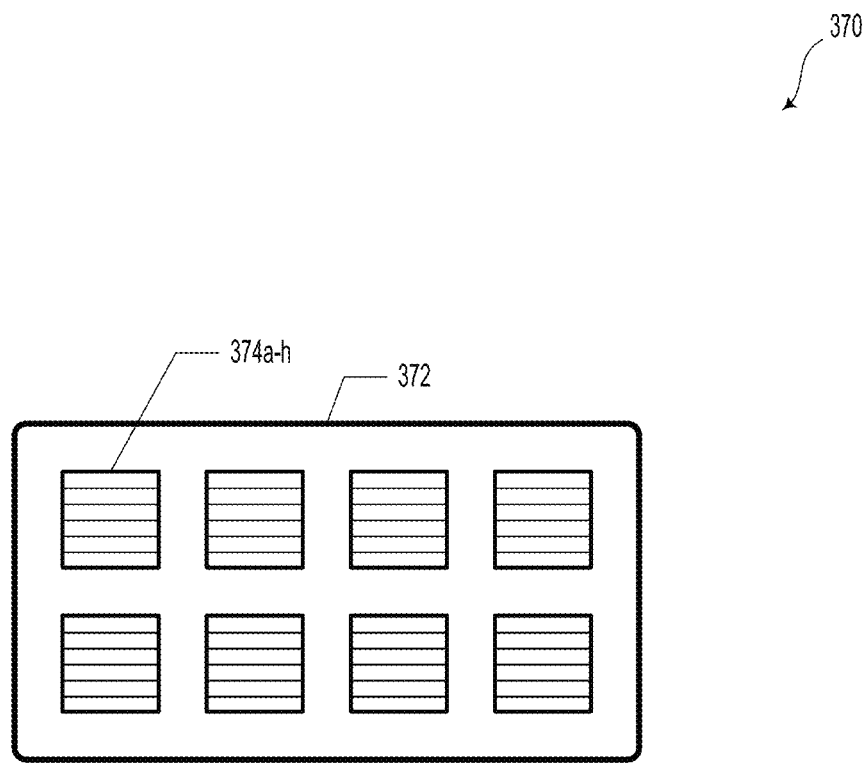
FIG. 3C illustrates a light source, according to an example embodiment.

FIGS. 3A, 3B, and 3C illustrate various embodiments of the system 100 and its elements. FIG. 3A illustrates a vehicle 300, according to an example embodiment. The vehicle 300 may include one or more sensor systems 302, 304, 306, 308, 310, 354a-d, and 356a-d. In some examples, the one or more sensor systems 302, 304, 306, 308, and 310 could include LIDAR and/or radar sensor units. One or more of the sensor systems 302, 304, 306, 308, and 310 may be configured to rotate about an axis (e.g., the z-axis) perpendicular to the given plane so as to illuminate an environment around the vehicle 300 with light pulses and/or radar energy. Additionally or alternatively, one or more of the sensor systems 302, 304, 306, 308, and 310 could include a movable mirror so as to direct emitted light pulses and/or radar energy in the environment of the vehicle 300. For LIDAR-based sensors, determining various aspects of reflected light pulses (e.g., the elapsed time of flight, polarization, etc.,) may provide information about the environment as described herein. Similarly, radar-based sensors may determine information about a given scene based on how radar energy interacts with the environment.

In an example embodiment, sensor systems 302, 304, 306, 308, and 310 may be configured to provide respective point cloud information or other types of information (e.g., maps, object databases, etc.) that may relate to physical objects within the environment of the vehicle 300. While vehicle 300 and sensor systems 302 and 304 are illustrated as including certain features, it will be understood that other types of sensors are contemplated within the scope of the present disclosure.

FIG. 3B illustrates a front view of sensor unit 350, according to an example embodiment. Sensor unit 350 could include a housing 352. In some embodiments, the housing 352 could be coupled to, or integrated into, the vehicle 300. In an example embodiment, the sensor unit 350 may include an imaging sensor 354, which could be similar or identical to imaging sensor 120, as illustrated and described in reference to FIG. 1. Additionally, the sensor unit 350 could include a ToF sensor 356, which could be similar or identical to ToF sensor 110, as illustrated and described in reference to FIG. 1. While FIG. 3B illustrates imaging sensor 354 and ToF sensor 356 as being disposed within a common housing 352, the imaging sensor 354 and ToF sensor 356 could be disposed in different locations. It will be understood that other arrangements of such elements are possible and contemplated herein.

FIG. 3C illustrates a light source 370, according to an example embodiment.

Light source 370 could include a housing 372. In some embodiments, the housing 372 could be coupled to, or integrated into, the vehicle 300. In an example embodiment, the light source 370 may include a plurality of light-emitting elements 374a-h, which could be similar or identical to light source 130, as illustrated and described in reference to FIG. 1. Light-emitting elements 374a-h could be disposed in an array or in another spatial arrangement. In an example embodiment, the light-emitting elements 374a-h could be light-emitting diodes (LEDs) or laser diodes. Other types of light sources are possible and contemplated.

The light-emitting elements 374a-h could be configured to emit light in the infrared (e.g., near infrared 700-1050 nm) wavelength range. However, in some embodiments, other wavelengths of light are contemplated. In some embodiments, the light-emitting elements 374a-h could be configured to emit light at different wavelengths from each other. That is, the light-emitting elements 374a-h could be configured to emit light at eight different wavelengths. In such scenarios, system 100 and/or vehicle 300 could be configured to disambiguate light signals emitted by discrete light-emitting elements (or between different light sources 370) based on its wavelength. In some embodiments, the multi-color light could be received by multi-color imaging sensors and/or multi-color ToF sensors.

In some embodiments, light-emitting elements 374a-h could include one or more optical elements configured to interact with the light emitted from the light-emitting elements 374a-h. Without limitation, the one or more optical elements could be configured to redirect, shape, attenuate, amplify, or otherwise adjust the emitted light. For example, the one or more optical elements could include a mirror, an optical fiber, a diffractive optic element, an aspherical lens, a cylindrical lens, or a spherical lens. Other types of optical elements are possible and contemplated.

In some example embodiments, the light-emitting elements 374a-h could be operable so as to emit light toward different spatial sectors (e.g., including different azimuthal angle ranges and/or elevation angle ranges) of the environment around vehicle 300. Furthermore, in some embodiments, the light-emitting elements 374a-h could be operable to emit light at different times during a given period of time. That is, each of the light-emitting elements 374a-h could be controlled to emit light during respective time periods over a given time span. For example, the light-emitting elements 374a-h could emit light in a serial pattern (e.g., one light-emitting element lit after another in a "chase" pattern). Additionally or alternatively, one or more of the light-emitting elements 374a-h could emit light in a parallel fashion (e.g., several light-emitting element emitting light simultaneously).

Returning to FIG. 3A, vehicle 300 could include a plurality of sensor units, which could be similar or identical to sensor unit 350, as illustrated and described in reference to FIG. 3B. Furthermore, the respective sensor units could each include imaging sensors 354a-d and ToF sensors 356a-d. As illustrated, the respective pairs of imaging sensors 354a-d and ToF sensors 356a-d could be coupled to, or integrated into, a front, right side, left side, and rear portion of the vehicle 300. Other mounting types and mounting locations are contemplated for the imaging sensors 354a-d and ToF sensors 356a-d. For example, in some embodiments, the imaging sensors 354a-d and ToF sensors 356a-d could be disposed in a rotatable mount configured to rotate about the z-axis so as to obtain imaging information and ToF information from an environment around the vehicle 300.

While sensor systems 354a/356a, 354b/356b, 354c/356c, and 354d/356d are illustrated as being collocated, it will be understood that other sensor arrangements are possible and contemplated. Furthermore, while certain locations and numbers of sensor systems are illustrated in FIGS. 3A-3C, it will be understood that different mounting locations and/or different numbers of the various sensor systems are contemplated.

Vehicle 300 could include a plurality of light sources 370a-d, which could be similar or identical to light source 130, as illustrated and described in reference to FIG. 1. As illustrated, light source 370a-d could be coupled to, or integrated into, a front, right side, left side, and rear portion of the vehicle 300. Other mounting types and mounting locations are contemplated for the plurality of light sources 370a-d. For example, in some embodiments, the light source 370 could be disposed in a rotatable mount configured to rotate about the z-axis so as to emit light toward a controllable azimuthal angle range.

Figure 4A:
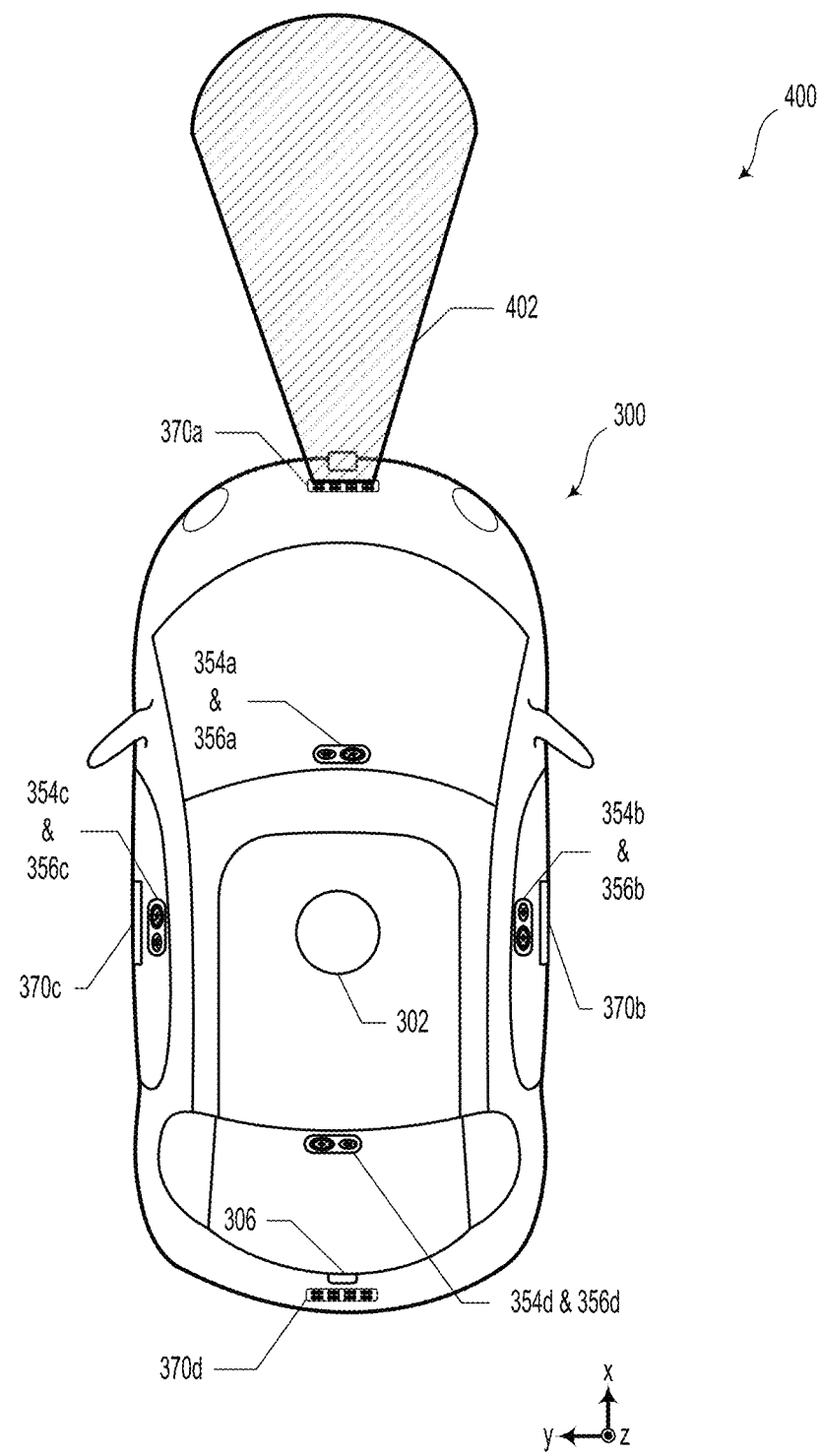
FIG. 4A illustrates a sensing scenario, according to an example embodiment.
Figure 4B:
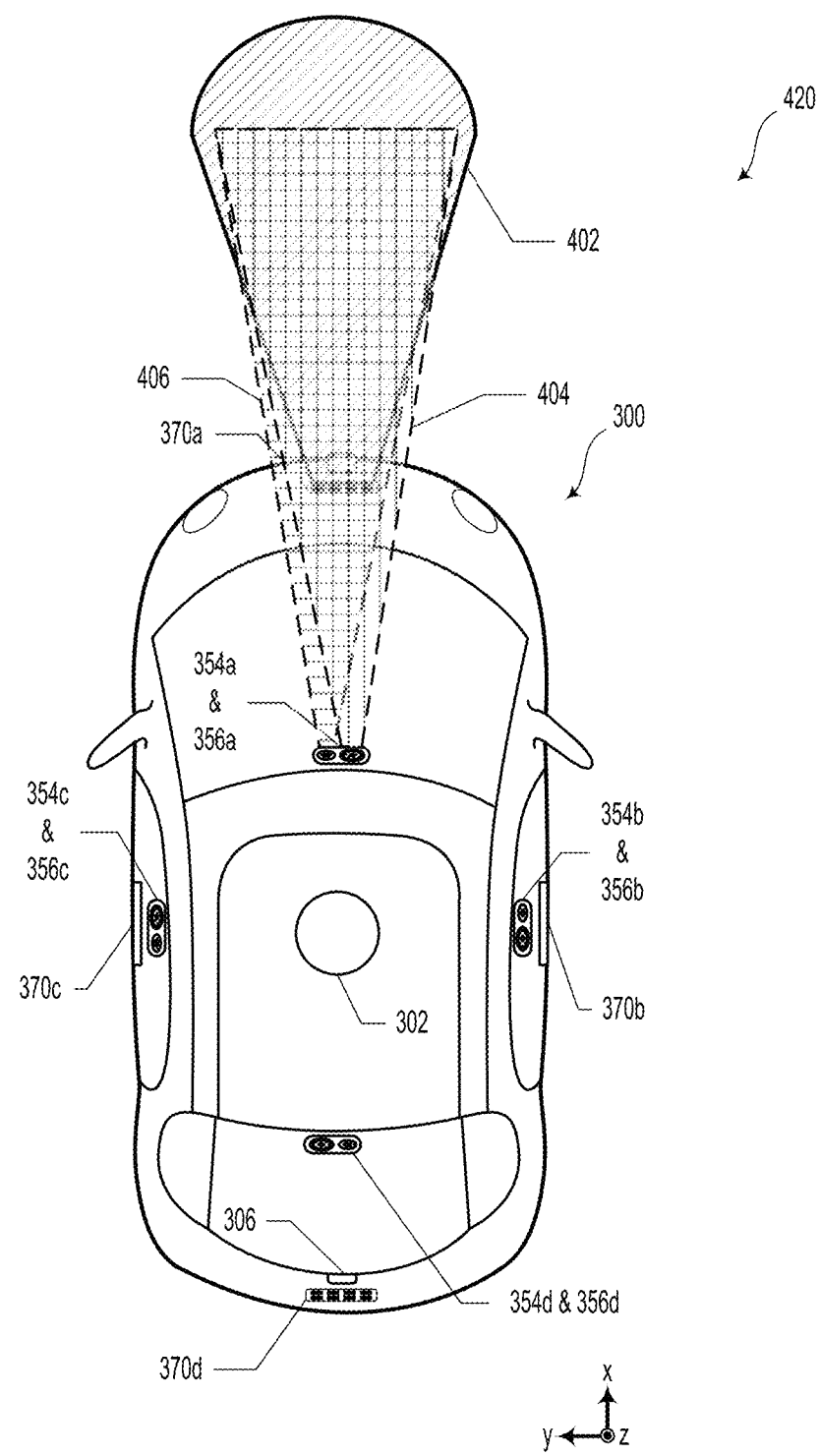
FIG. 4B illustrates a sensing scenario, according to an example embodiment.

FIG. 4A-4B illustrate various sensing scenarios 400 and 420. In each case, for purposes of clarity, the sensing scenarios 400 and 420 may illustrate a subset of possible spatial sectors and sensor profiles/ranges. It will be understood that other spatial sectors are possible and contemplated within the scope of the present disclosure. Furthermore, it will be understood that the sensing scenarios 400 and 420 may illustrate only single "snapshots" in time and that spatial sectors and sensor profiles/ranges could be dynamically adjusted so as to periodically or continuously change based on, among other factors, a dynamically-changing operating context of the vehicle 300.

FIG. 4A illustrates an overhead/top view of vehicle 300 in a sensing scenario 400, according to an example embodiment. Sensing scenario 400 includes illuminating a front-facing sector of an environment of the vehicle 300 with illumination light 402. Namely, light source 370a could emit light from one or more light-emitting elements so as to illuminate the front-facing sector of the vehicle 300.

The illumination light 402 could be provided according to a pulsed illumination schedule or a continuous-wave illumination schedule. Other types of illumination schedules are contemplated. For example, the illumination light 402 could be provided "on-demand" from controller 150 or based on the operating context of the vehicle 300. As an example, the illumination light 402 could be provided in low-light conditions (e.g., at night) or in response to determining an object in the environment of the vehicle 300. As a non-limiting example, another sensor system of the vehicle 300 could identify an ambiguous or unknown object (not illustrated) ahead of the vehicle 300. The ambiguous or unknown object could be identified for further analysis. In such a scenario, the controller 150 could cause the light source 370a to provide illumination light 402 to the front-facing sector.

While FIG. 4A illustrates a front-facing sector as being illuminated, in some embodiments, the light source 370a may be configured to adjust a pointing direction of the illumination light 402. It will also be understood that the other light sources 370b-d could provide similar illumination light into various spatial sectors corresponding with their respective positions. For example, light source 370d could emit illumination light into a rear-facing spatial sector.

It will be understood that while illumination light 402 and spatial sectors appear as being two-dimensional in FIG. 4A-4B, three-dimensional spatial volumes are contemplated. For example, the illumination light 402 and/or spatial sectors could be defined as between an azimuthal angle range and also between a maximum elevation angle and a minimum elevation angle.

FIG. 4B illustrates an overhead/top view of the vehicle 300 in a sensing scenario 420, according to an example embodiment. Sensing scenario 420 could include imaging sensor 354a obtaining light from a field of view 404. At least a portion of the light obtained by the imaging sensor 354a could be from illumination light 402 upon interaction with the environment of the vehicle 300. The field of view 404 could include a front-facing spatial sector of the vehicle 300. In some embodiments, the field of view 404 of the imaging sensor 354a could partially or fully overlap with the volume illuminated by illumination light 402. Based on the light obtained from field of view 404, the imaging sensor 354a may provide an image of the scene based, at least in part, on the illumination light 402.

Sensing scenario 420 also illustrates ToF sensor 356a obtaining light from a field of view 406. At least a portion of the light obtained by the ToF sensor 356a could be from illumination light 402 that has interacted with the environment of the vehicle 300. The field of view 406 could include a front-facing spatial sector of the vehicle 300. In some embodiments, the field of view 406 of the ToF sensor 356a could partially or fully overlap with the volume illuminated by illumination light 402. Based on the light obtained from field of view 406, the ToF sensor 356a may provide a depth map of the scene based, at least in part, on the illumination light 402.

III. Example Methods

Figure 5:
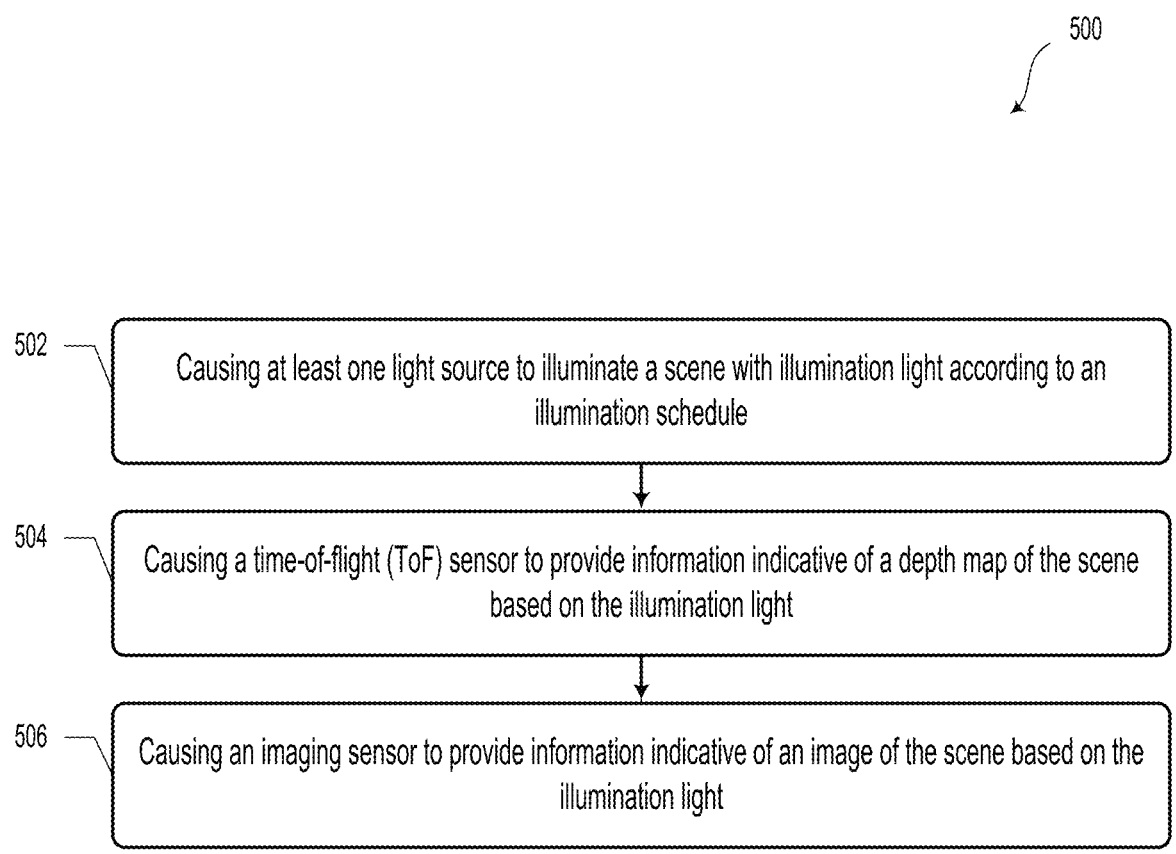
FIG. 5 illustrates a method, according to an example embodiment.

FIG. 5 illustrates a method 500, according to an example embodiment. It will be understood that the method 500 may include fewer or more steps or blocks than those expressly illustrated or otherwise disclosed herein. Furthermore, respective steps or blocks of method 500 may be performed in any order and each step or block may be performed one or more times. In some embodiments, some or all of the blocks or steps of method 500 may be carried out by elements of system 100. For example, some or all of method 500 could be carried out by controller 150, ToF sensor(s) 110, and/or imaging sensor(s) 120 as illustrated and described in relation to FIG. 1. Furthermore, method 500 may be described, at least in part, by the operating scenario 200, as illustrated in relation to FIG. 2. Yet further, method 500 may be carried out, at least in part, by vehicle 300 as illustrated and described in relation to FIG. 3A. Method 500 may be carried out in scenarios similar or identical to scenario 400 as illustrated and described in relation to FIGS. 4A and 4B. It will be understood that other scenarios are possible and contemplated within the context of the present disclosure.

Block 502 includes causing at least one light source to illuminate a scene with illumination light according to an illumination schedule. In example embodiments, the illumination schedule could include at least one of: a predetermined light pulse repetition rate, a predetermined light pulse duration, a predetermined light pulse intensity, or a predetermined light pulse duty cycle.

Block 504 includes causing a time-of-flight (ToF) sensor to provide information indicative of a depth map of the scene based on the illumination light. In an example embodiment, the controller 150 could cause the ToF sensor to initiate a depth scan based on the illumination light. In some embodiments, a clock signal or trigger signal could be provided to the ToF sensor to synchronize it with the one or more light pulses emitted into the environment. Upon obtaining depth map information, the ToF sensor could provide information indicative of the depth map to the controller 150 or another element of the system 100.

Block 506 includes causing an imaging sensor to provide information indicative of an image of the scene based on the illumination light. In some embodiments, the controller 150 could trigger a mechanical or electronic shutter of the imaging sensor to open and obtain an image of the scene. Additionally or alternatively, the controller 150 could provide information about the scene (e.g., ambient light level, specific sectors of concern, desired resolution, time of day, etc.). Furthermore, the controller 150 or the light source 130 could provide a clock signal or trigger signal so as to synchronize the imaging sensor and light source. Upon obtaining the image of the scene, the imaging sensor could provide information indicative of the image to the controller 150 or another element of system 100.

Additionally or alternatively, method 500 could include selecting the illumination schedule from among a plurality of possible illumination schedules so as to provide a desired exposure for the imaging sensor. The illumination schedule could be based on a number of variables, including external light level, other light sources, angle of sun, etc. As such, method 500 could include adjusting the illumination schedule based on an amount of ambient light (e.g., as measured from an ambient light sensor), a time of day, and/or weather condition.

Furthermore, method 500 could include determining a high-resolution depth map of the scene based on the depth map of the scene and the image of the scene.

Yet further method 500 could include determining at least one inference about the scene based on the depth map of the scene and the image of the scene. In some embodiments, the at least one inference could include information about one or more objects in an environment of a vehicle or an operating context of the vehicle.

In example embodiments, determining the at least one inference could be performed by at least one deep neural network. Additionally or alternatively, some or all blocks of method 500 could be carried out by computing systems implementing other types of artificial intelligence-based algorithms.

While systems and methods described herein may relate to a single hybrid imaging system mounted on a vehicle, it will be understood that multiple hybrid imaging systems could be mounted on a single vehicle. Furthermore, embodiments involving multiple vehicles each having one or more respective hybrid imaging systems are contemplated and possible within the context of the present disclosure. Namely, in some embodiments, each hybrid imaging system could have a different modulation frequency and/or temporal offset so as to minimize interference with one another when close to one another (e.g., within 200 meters of one another or closer).

Figure 6:
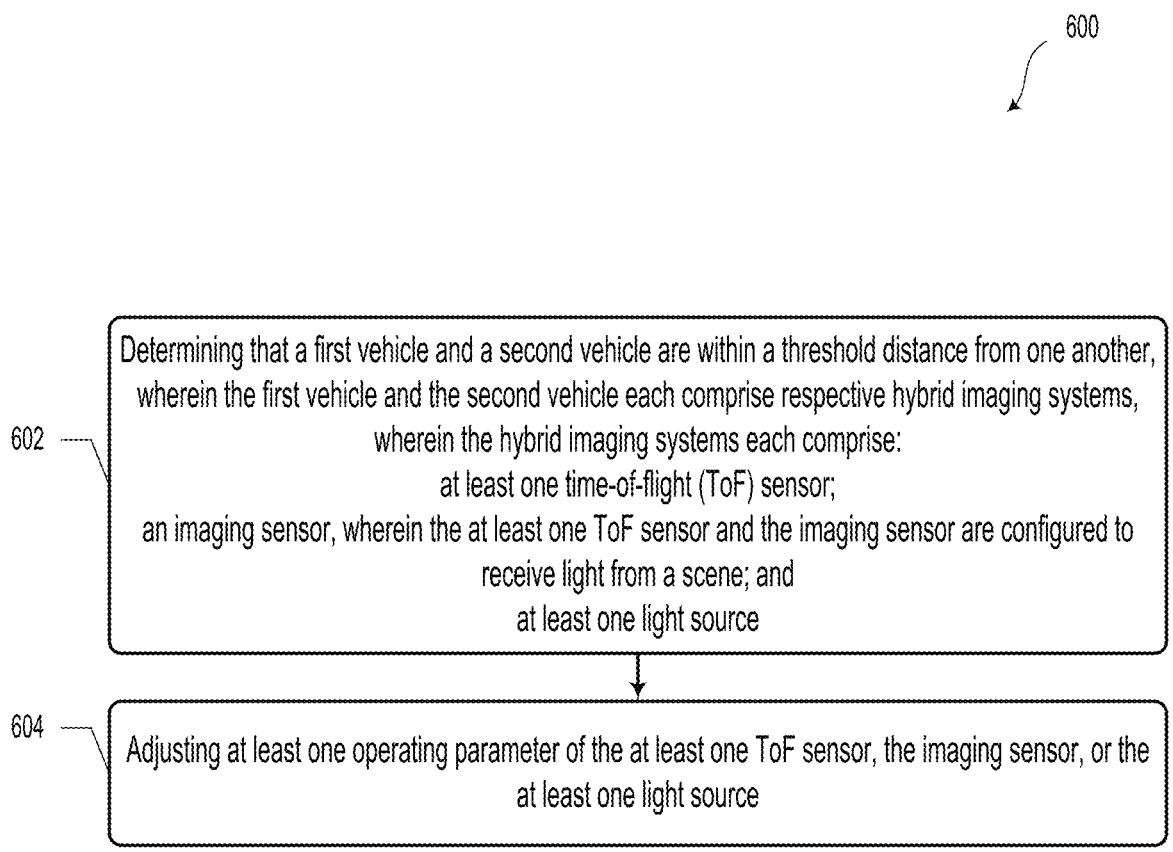
FIG. 6 illustrates a method, according to an example embodiment.

FIG. 6 illustrates a method 600, according to an example embodiment. Method 600 could include blocks or elements that are similar or identical to corresponding elements of methods 500 or 700, as illustrated and described in reference to FIGS. 5 and 7.

Block 602 includes determining that a first vehicle and a second vehicle are within a threshold distance from one another. In such a scenario, the first vehicle and the second vehicle each include respective hybrid imaging systems. The hybrid imaging systems could be similar or identical to system 100, as illustrated and described in reference to FIG. 1. That is, the hybrid imaging systems could each include at least one time-of-flight (ToF) sensor, an imaging sensor, and at least one light source. The at least one ToF sensor and the imaging sensor are configured to receive light from a scene.

Block 604 includes adjusting at least one operating parameter of the at least one ToF sensor, the imaging sensor, or the at least one light source.

Additionally or alternatively, a central or regional server could assign and/or adjust the respective modulation frequencies and/or temporal offset so as to avoid interference between proximate hybrid imaging systems. In some embodiments, the central or regional server could monitor one or more operating parameters of the hybrid imaging systems (e.g., modulation frequency, temporal offset, cross-talk amplitude, etc.) and/or a location of the respective vehicles associated with the hybrid imaging systems. In response to two hybrid imaging systems and/or their respective vehicles approaching within a threshold distance of one another, the central or regional server could instruct one or both of the hybrid imaging systems to change their modulation frequency and/or a temporal offset so as to reduce or eliminate the possibility for cross-talk interference. Additionally or alternatively, the central or regional server could maintain a database that includes an identifier associated with each hybrid imaging systems and at least one operating parameter associated with each hybrid imaging system (e.g., modulation frequency and/or temporal offset). In some embodiments, in response to the two hybrid imaging systems and/or their respective vehicles approaching within a threshold distance from one another, the central or regional server could compare the database and only instruct the one or more hybrid imaging systems to adjust their operating condition(s) if there may be a possibility for cross-talk interference.

While a central or regional server is described above, it will be understood that other, decentralized systems and methods to avoid cross-talk are contemplated. For example, if a hybrid imaging system detects cross-talk interference being above a threshold amplitude, the hybrid imaging system could automatically change its own modulation frequency and/or temporal offset. Additionally or alternatively, the hybrid imaging system and/or its respective vehicle could be in communication with nearby vehicles and/or their hybrid imaging systems in an effort to negotiate local use of modulation frequencies and/or temporal offsets so as to minimize or eliminate cross-talk interference between nearby systems. It will be understood that other ways to mitigate interference between active sensor systems are contemplated and possible within the context of the present disclosure.

It will be understood that systems and methods described herein could relate to ways in which the ToF sensors and the imaging sensors could be used to improve range-finding as compared to a ToF sensor utilized in isolation. For example, one or more images from an imaging sensor could be compared to an initial depth map to determine range-aliased artifacts in ToF data. That is, based on such a comparison, an updated depth map may be provided, which may fewer range-aliased artifacts than that of the initial depth map.

Additionally or alternatively, various operating parameters of the ToF sensor and/or the illumination light could be controlled based on one or more images from an imaging sensor. For example, the image(s) may provide information indicative of a region of interest. For instance, the region of interest could include another vehicle, a pedestrian, an obstacle, a road marker, a road sign, etc. Based on the region of interest in the image(s), the operating parameters of the ToF sensor and/or the illumination light could be adjusted. For example, if the region of interest includes a pedestrian in a crosswalk, the operating parameters (e.g., modulation frequency, illumination intensity, refresh rate, etc.) of the ToF sensor and/or the illumination light could be optimized or otherwise adjusted so as to provide a more accurate depth map for the region of interest. In such a scenario, the operating parameters may be adjusted to correspond to an estimated distance of the pedestrian in the crosswalk, or a distance range, etc.

Systems and methods described herein may involve prior information about the environment. Such prior information could include a high-fidelity three-dimensional model of the local environment of a vehicle and/or within a scene of the image sensor or the ToF sensor. In such scenarios, the prior information could reside, at least in part, at the vehicle and/or at a central or regional server.

In some embodiments, the prior information may be utilized in combination with the image information and/or the ToF information/depth map to better calibrate the sensors and/or to better localize the vehicle. That is, a comparison between the prior information and at least one image or at least one depth map could help determine intrinsic and extrinsic characteristics of the image sensor and/or ToF sensor. In such scenarios, the determined intrinsic and/or extrinsic characteristics could be used to calibrate the image sensor and/or the ToF sensor. Additionally or alternatively, a comparison between the prior information and the at least one image or the at least one depth map could include aligning or registering the prior information with the at least one image or the at least one depth map. In so doing, the alignment/registration process could help determine a more-accurate absolute position, heading, speed, or other characteristics of the vehicle and/or other aspects of its environment. In other words, the prior information could be utilized in conjunction with the at least one image and/or the at least one depth map to provide more accurate information about the vehicle than the sensor information taken alone. In such scenarios, the prior information could represent a reference frame within which the vehicle could be localized.

Figure 7:
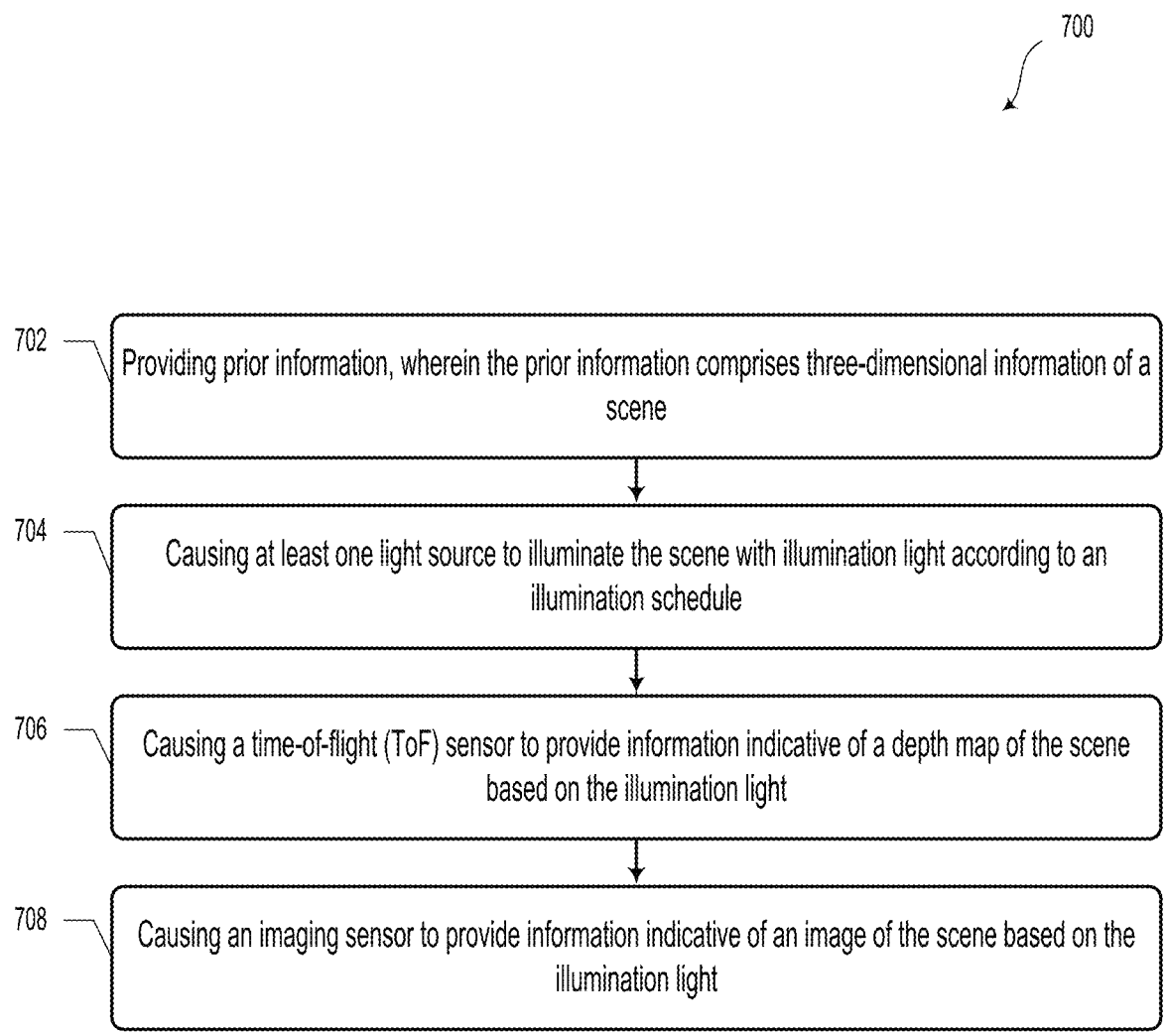
FIG. 7 illustrates a method, according to an example embodiment.

FIG. 7 illustrates a method 700, according to an example embodiment. Blocks and/or elements of method 700 could be similar or identical to corresponding elements of methods 500 or 600, as illustrated and described in reference to FIGS. 5 and 6

Block 702 includes providing prior information, which includes three-dimensional information of a scene.

Block 704 includes causing at least one light source to illuminate the scene with illumination light according to an illumination schedule.

Block 706 includes causing a time-of-flight (ToF) sensor to provide information indicative of a depth map of the scene based on the illumination light.

Block 708 includes causing an imaging sensor to provide information indicative of an image of the scene based on the illumination light.

Additionally or alternatively, the prior information could be utilized to improve depth estimation. In such a scenario, the prior information could be projected into the image and/or the depth map(s). Various methods (e.g., ray tracing, Principle Components Ordination (PCoA), Non-metric Multidimensional Scaling (NMDS), or other methods) could be used to perform the projection of three-dimensional prior information onto the image or depth map, each of which are contemplated herein. By projecting the prior information into the image or depth map, depth information could double-checked, calibrated, verified, and/or estimated more accurately.

Yet further, the prior information could be utilized to perform background subtraction. In such a scenario, the prior information could include information about objects that are outside a relevant sensor depth (e.g., far away from the vehicle). In such situations, image information and/or depth map information corresponding to objects that are outside the relevant sensor depth could be ignored, discounted, deleted, and/or processed at a lower resolution than other, more relevant, regions of the environment.

Additionally, the prior information could be used, at least in part, to determine where retroreflective objects may be within a given environment. When a vehicle (and its hybrid imaging system(s)) enter such an environment, it can adjust operation of the hybrid imaging system so as to mitigate the effects of the retroreflective objects. For instance, the hybrid imaging system could illuminate the environment corresponding to a known retroreflective object at a lower intensity level as compared to other regions of the environment. In such a scenario, the hybrid imaging system can avoid "blooming" or "blinding" effects that can occur due to retroreflective objects. Additionally or alternatively, the hybrid imaging system may operate at a different modulation frequency and/or illuminate the illumination source at a different rate. Other ways to mitigate the effects of retroreflectors are possible and contemplated herein.

In some embodiments, a plurality of image frames from the image sensor could be utilized to obtain information about the scene, which could be utilized together with other information described in the present disclosure. For example, "optical flow" can be obtained by a pattern of apparent motion of an object between two consecutive image frames. The optical flow could include, for example, a two-dimensional vector field that includes the displacement of corresponding objects in the scene between a first image frame and a second image frame. Based on the optical flow, distances to the objects can be inferred and/or predicted. Such distance information from the optical flow could be utilized to constrain the range of depths estimated when combining the image information and ToF information. That is, the optical flow could provide rough information about depth of objects in a given scene. The rough depth information could be used to determine operating parameters for the ToF sensor and/or the illumination source. Additionally or alternatively, the rough depth information could be used to bound or constrain a set of operating parameters used by the hybrid imaging system more generally.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various aspects and embodiments have been disclosed herein, other aspects and embodiments will be apparent to those skilled in the art. Embodiments of the present disclosure may thus relate to one of the enumerated example embodiments (EEEs) listed below.

EEE 1 is a system comprising:
at least one time-of-flight (ToF) sensor;
an imaging sensor, wherein the at least one ToF sensor and the imaging sensor are configured to receive light from a scene;
at least one light source; and
a controller that carries out operations, the operations comprising:
causing the at least one light source to illuminate at least a portion of the scene with illumination light according to an illumination schedule;
causing the at least one ToF sensor to provide information indicative of a depth map of the scene based on the illumination light; and
causing the imaging sensor to provide information indicative of an image of the scene based on the illumination light.

EEE 2 is the system of EEE 1, wherein the at least one ToF sensor comprises a plurality of complementary metal-oxide semiconductor (CMOS) or charge-coupled device (CCD) photosensitive elements.

EEE 3 is the system of EEE 1, wherein the imaging sensor comprises a plurality of photosensitive elements, wherein the plurality of photosensitive elements comprises at least one million photosensitive elements.

EEE 4 is the system of EEE 1, wherein the illumination schedule comprises at least one of: a predetermined light pulse repetition rate, a predetermined light pulse duration, a predetermined light pulse intensity, or a predetermined light pulse duty cycle.

EEE 5 is the system of EEE 1, wherein the at least one light source comprises at least one of: a laser diode, a light-emitting diode, a plasma light source, a strobe light, a solid-state laser, or a fiber laser.

EEE 6 is the system of EEE 1, wherein the operations further comprise selecting an illumination schedule from among a plurality of possible illumination schedules so as to provide a desired exposure for the imaging sensor.

EEE 7 is the system of EEE 1, wherein the operations further comprise determining a high-resolution depth map of the scene based on the depth map of the scene and the image of the scene.

EEE 8 is the system of EEE 1, wherein the at least one ToF sensor, the imaging sensor, and the at least one light source are coupled to a common substrate.

EEE 9 is the system of EEE 1, wherein the at least one ToF sensor, the imaging sensor, and the at least one light source are coupled to a vehicle.

EEE 10 is the system of EEE 1, wherein the operations further comprise determining at least one inference about the scene based on the depth map of the scene and the image of the scene.

EEE 11 is the system of EEE 10, wherein the at least one inference comprises information about one or more objects in an environment of a vehicle or an operating context of the vehicle.

EEE 12 is the system of EEE 10, wherein the controller comprises at least one deep neural network, wherein the determining the at least one inference is performed by the at least one deep neural network.

EEE 13 is a method comprising:
causing at least one light source to illuminate a scene with illumination light according to an illumination schedule;
causing a time-of-flight (ToF) sensor to provide information indicative of a depth map of the scene based on the illumination light; and
causing an imaging sensor to provide information indicative of an image of the scene based on the illumination light.

EEE 14 is the method of EEE 13, wherein the illumination schedule comprises at least one of: a predetermined light pulse repetition rate, a predetermined light pulse duration, a predetermined light pulse intensity, or a predetermined light pulse duty cycle.

EEE 15 is the method of EEE 13, further comprising selecting the illumination schedule from among a plurality of possible illumination schedules so as to provide a desired exposure for the imaging sensor.

EEE 16 is the method of EEE 13, further comprising determining a high-resolution depth map of the scene based on the depth map of the scene and the image of the scene.

EEE 17 is the method of EEE 13, further comprising determining at least one inference about the scene based on the depth map of the scene and the image of the scene.

EEE 18 is the method of EEE 17, wherein the at least one inference comprises information about one or more objects in an environment of a vehicle or an operating context of the vehicle.

EEE 19 is the method of EEE 17, wherein determining the at least one inference is performed by at least one deep neural network.

EEE 20 is the method of EEE 13, further comprising adjusting the illumination schedule based on an amount of ambient light or a time of day.

EEE 21 is the method of EEE 13 further comprising:
comparing the image of the scene and the depth map;
based on the comparison, determining at least one range-aliased artifact in the depth map; and
providing an updated depth map based on the determined at least one range-aliased artifact.

EEE 22 is the method of EEE 13 further comprising:
determining, based on the image of the scene, a region of interest;
adjusting at least one operating parameter of the ToF sensor based on an object within the region of interest.

EEE 23 is the method of EEE 13 further comprising:
determining, based on a plurality of images of the scene, an optical flow representation of the scene; and
adjusting at least one operating parameter of the ToF sensor or the illumination light based on the optical flow representation of the scene.

EEE 24 is a method comprising:
determining that a first vehicle and a second vehicle are within a threshold distance from one another, wherein the first vehicle and the second vehicle each comprise respective hybrid imaging systems, wherein the hybrid imaging systems each comprise:
at least one time-of-flight (ToF) sensor;

an imaging sensor, wherein the at least one ToF sensor and the imaging sensor are configured to receive light from a scene; and
at least one light source; and
adjusting at least one operating parameter of the at least one ToF sensor, the imaging sensor, or the at least one light source.

EEE 25 is the method of EEE 24, wherein adjusting the at least one operating parameter comprises a server adjusting a modulation frequency of at least one ToF sensor or adjusting a temporal offset of the at least one ToF sensor so as to reduce cross-talk between the respective hybrid imaging systems.

EEE 26 is the method of EEE 25, wherein the server maintains a database of at least one operating parameter for each hybrid imaging system associated with respective vehicles within a given region.

EEE 27 is a method comprising:
providing prior information, wherein the prior information comprises three-dimensional information of a scene;
causing at least one light source to illuminate the scene with illumination light according to an illumination schedule;
causing a time-of-flight (ToF) sensor to provide information indicative of a depth map of the scene based on the illumination light; and
causing an imaging sensor to provide information indicative of an image of the scene based on the illumination light.

EEE 28 is the method of EEE 27, further comprising:
comparing the prior information to at least one of the depth map or the image of the scene; and
based on the comparison, determine a localized position of a vehicle.

EEE 29 is the method of EEE 27, further comprising:
comparing the prior information to at least one of the depth map or the image of the scene; and
based on the comparison, determine a calibration condition of the image sensor or the ToF sensor.

EEE 30 is the method of EEE 27, further comprising:
projecting the prior information into or onto at least one of the depth map or the image of the scene; and
based on the projection, determine a localized position of a vehicle.

EEE 31 is the method of EEE 27, further comprising:
determining a background portion of the prior information; and
subtracting or ignoring at least a portion of the depth map or the image of the scene corresponding to the background portion.

EEE 32 is the method of EEE 27, further comprising:
determining at least one retroreflective object based on the prior information; and
while scanning a portion of the scene corresponding to the at least one retroreflective object, adjusting at least one operating parameter of the ToF sensor or the image sensor.

The various disclosed aspects and embodiments are for purposes of illustration and are not intended to be limiting, with the true scope being indicated by the following claims.

What is claimed is:

1. A system comprising:
at least one time-of-flight (ToF) sensor;
an imaging sensor, wherein the at least one ToF sensor and the imaging sensor are configured to receive light from a scene comprising a spatial sector, wherein the spatial sector comprises a portion of an environment around a vehicle; and
a controller that carries out operations, the operations comprising:
receiving illumination light from at least a portion of the scene, wherein the illumination light is based on an illumination schedule;
causing the at least one ToF sensor to provide information indicative of a depth map of the scene based on the illumination light;
causing the imaging sensor to provide information indicative of an image of the scene based on the illumination light;
determining, based on a plurality of images of the scene, an optical flow representation of the scene; and
adjusting at least one operating parameter of the ToF sensor or the illumination light based on the optical flow representation of the scene.

2. The system of claim 1, wherein the illumination schedule comprises at least one of: a predetermined light pulse repetition rate, a predetermined light pulse duration, a predetermined light pulse intensity, or a predetermined light pulse duty cycle.

3. The system of claim 1, wherein the operations further comprise causing at least one light source to illuminate at least the portion of the scene with the illumination light according to the illumination schedule.

4. The system of claim 1, wherein the operations further comprise determining a high resolution depth map of the scene based on the depth map of the scene and the image of the scene.

5. The system of claim 1, wherein the at least one ToF sensor and the imaging sensor are coupled to a common substrate.

6. The system of claim 1, wherein the at least one ToF sensor is operable to provide a distance based point map of the scene.

7. The system of claim 1, wherein the operations further comprise determining at least one inference about the scene based on the depth map of the scene and the image of the scene.

8. The system of claim 7, wherein the at least one inference comprises information about one or more objects in the environment of the vehicle or an operating context of the vehicle.

9. The system of claim 7, wherein the controller comprises at least one deep neural network, wherein the determining the at least one inference is performed by the at least one deep neural network.

10. The system of claim 1, wherein the at least one operating parameter of the ToF sensor includes one of: a modulation frequency, an illumination intensity, and a refresh rate.

11. A method comprising:
receiving illumination light from at least a portion of a scene, wherein the illumination light is based on an illumination schedule;
causing a time-of-flight (ToF) sensor to provide information indicative of a depth map of the scene based on the illumination light;
causing an imaging sensor to provide information indicative of an image of the scene based on the illumination light;
determining, based on a plurality of images of the scene, an optical flow representation of the scene; and adjusting at least one operating parameter of the ToF sensor or the illumination light based on the optical flow representation of the scene.

12. The method of claim 11, wherein the illumination schedule comprises at least one of: a predetermined light pulse repetition rate, a predetermined light pulse duration, a predetermined light pulse intensity, or a predetermined light pulse duty cycle.

13. The method of claim 11, further comprising causing at least one light source to illuminate at least the portion of the scene with the illumination light according to the illumination schedule.

14. The method of claim 11, further comprising determining a high-resolution depth map of the scene based on the depth map of the scene and the image of the scene.

15. The method of claim 11, further comprising determining at least one inference about the scene based on the depth map of the scene and the image of the scene.

16. The method of claim 15, wherein the at least one inference comprises information about one or more objects in an environment of a vehicle or an operating context of the vehicle.

17. The method of claim 15, wherein determining the at least one inference is performed by at least one deep neural network.

18. The method of claim 11, further comprising adjusting the illumination schedule based on an amount of ambient light or a time of day.

19. The method of claim 11 further comprising:

comparing the image of the scene and the depth map;

based on the comparison, determining at least one range-aliased artifact in the depth map; and providing an updated depth map based on the determined at least one range-aliased artifact.

20. The method of claim 11 further comprising:

determining, based on the image of the scene, a region of interest; and adjusting at least one operating parameter of the ToF sensor based on an object within the region of interest.

* * * * *